United States Patent
Hirota

(10) Patent No.: US 8,773,684 B2
(45) Date of Patent: Jul. 8, 2014

(54) IMAGE FORMING APPARATUS AND PRINT CONTROL METHOD

(75) Inventor: Masato Hirota, Osaka (JP)

(73) Assignee: Kyocera Document Solutions, Inc. (JP)

( * ) Notice: Subject to any disclaimer, the term of this patent is extended or adjusted under 35 U.S.C. 154(b) by 67 days.

(21) Appl. No.: 13/572,008

(22) Filed: Aug. 10, 2012

(65) Prior Publication Data

US 2013/0050729 A1     Feb. 28, 2013

(30) Foreign Application Priority Data

Aug. 26, 2011    (JP) ................................. 2011-185200

(51) Int. Cl.
*G06K 15/00*     (2006.01)

(52) U.S. Cl.
USPC ....... 358/1.14; 358/1.12; 358/1.13; 358/1.15; 358/1.17; 358/1.18; 271/265.02; 271/265.03; 271/265.04; 271/298; 399/21; 399/27; 399/33; 399/45

(58) Field of Classification Search
CPC .......... G06G 15/70; G03G 2215/0059; B65H 2511/528
See application file for complete search history.

(56) References Cited

U.S. PATENT DOCUMENTS

| | | | | |
|---|---|---|---|---|
| 8,490,968 | B2* | 7/2013 | Kokubo | 271/259 |
| 2004/0046315 | A1* | 3/2004 | Jewell | 271/262 |
| 2007/0090586 | A1 | 4/2007 | Ohnishi et al. | |
| 2008/0174793 | A1* | 7/2008 | Mutsuno | 358/1.6 |
| 2011/0135326 | A1* | 6/2011 | Anno | 399/21 |
| 2011/0234736 | A1* | 9/2011 | Taguchi et al. | 347/179 |
| 2011/0274454 | A1* | 11/2011 | Teshima et al. | 399/45 |
| 2012/0025439 | A1* | 2/2012 | Yahata et al. | 270/58.07 |
| 2012/0070176 | A1* | 3/2012 | Nose | 399/82 |
| 2012/0093525 | A1* | 4/2012 | Ota | 399/21 |

FOREIGN PATENT DOCUMENTS

| | | |
|---|---|---|
| JP | 2002-333797 | 11/2002 |
| JP | 2004-004181 | 1/2004 |
| JP | 2007-124040 | 5/2007 |

* cited by examiner

*Primary Examiner* — Hilina K Demeter

(57) ABSTRACT

An image forming apparatus according to the present disclosure includes: a printing unit configured to perform printing on a recording medium; a multiple-sheet-feed detecting unit configured to detect a multiple sheet feed of the recording medium; an image holding unit configured to hold an image expected to print on the recording medium on which the multiple sheet feed is detected (i.e. the multi-fed medium); and a print control unit configured to control the printing unit. The print control unit is further configured (a) to cancel printing on the multi-fed medium, and (b) to cause the printing unit to print the held image on another recording medium, which (b1) is in transfer after the multi-fed medium, (b2) is nearest in a transferring order to the multi-fed medium, and (b3) has a property same as that of the multi-fed medium.

6 Claims, 11 Drawing Sheets

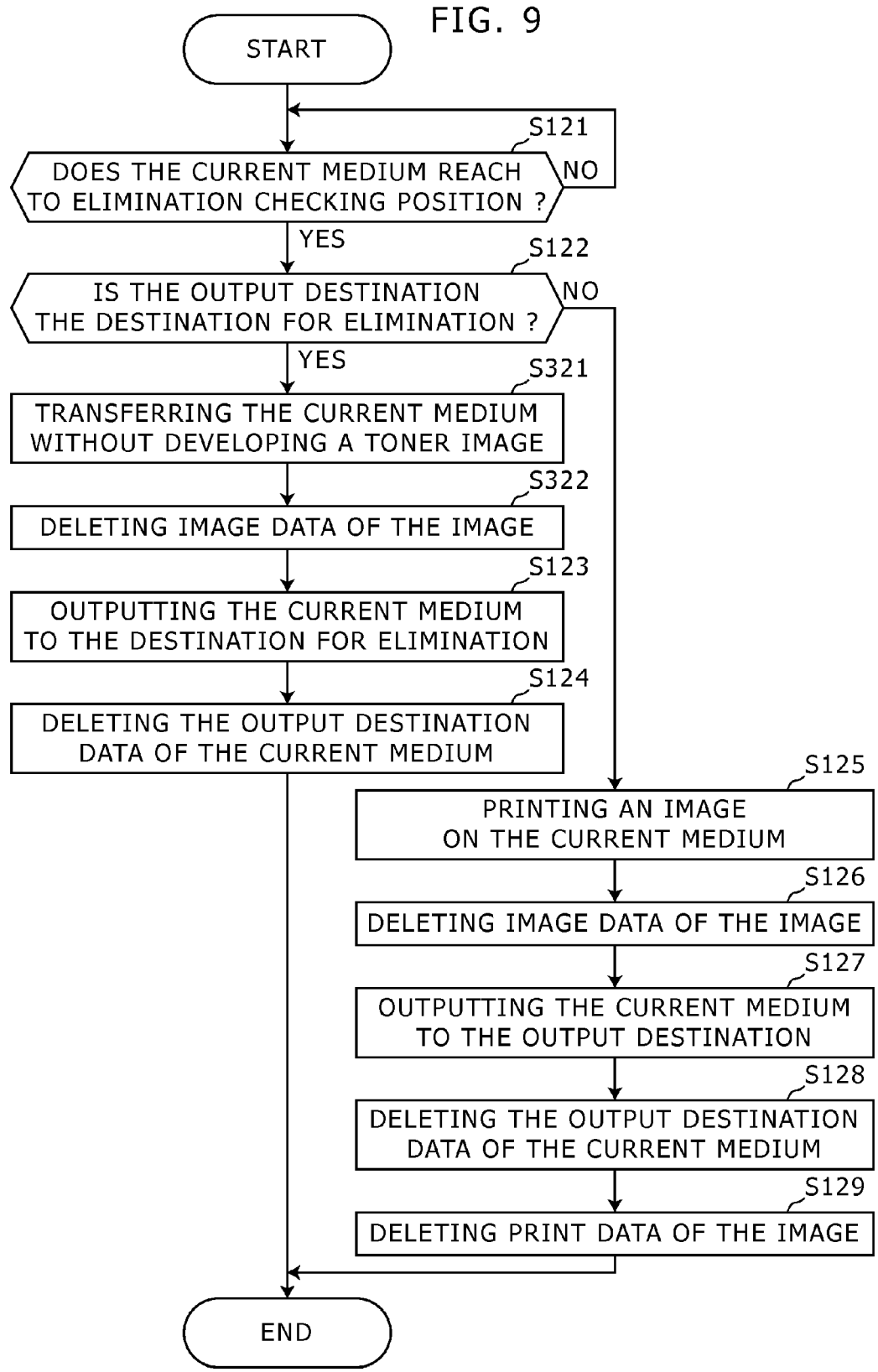

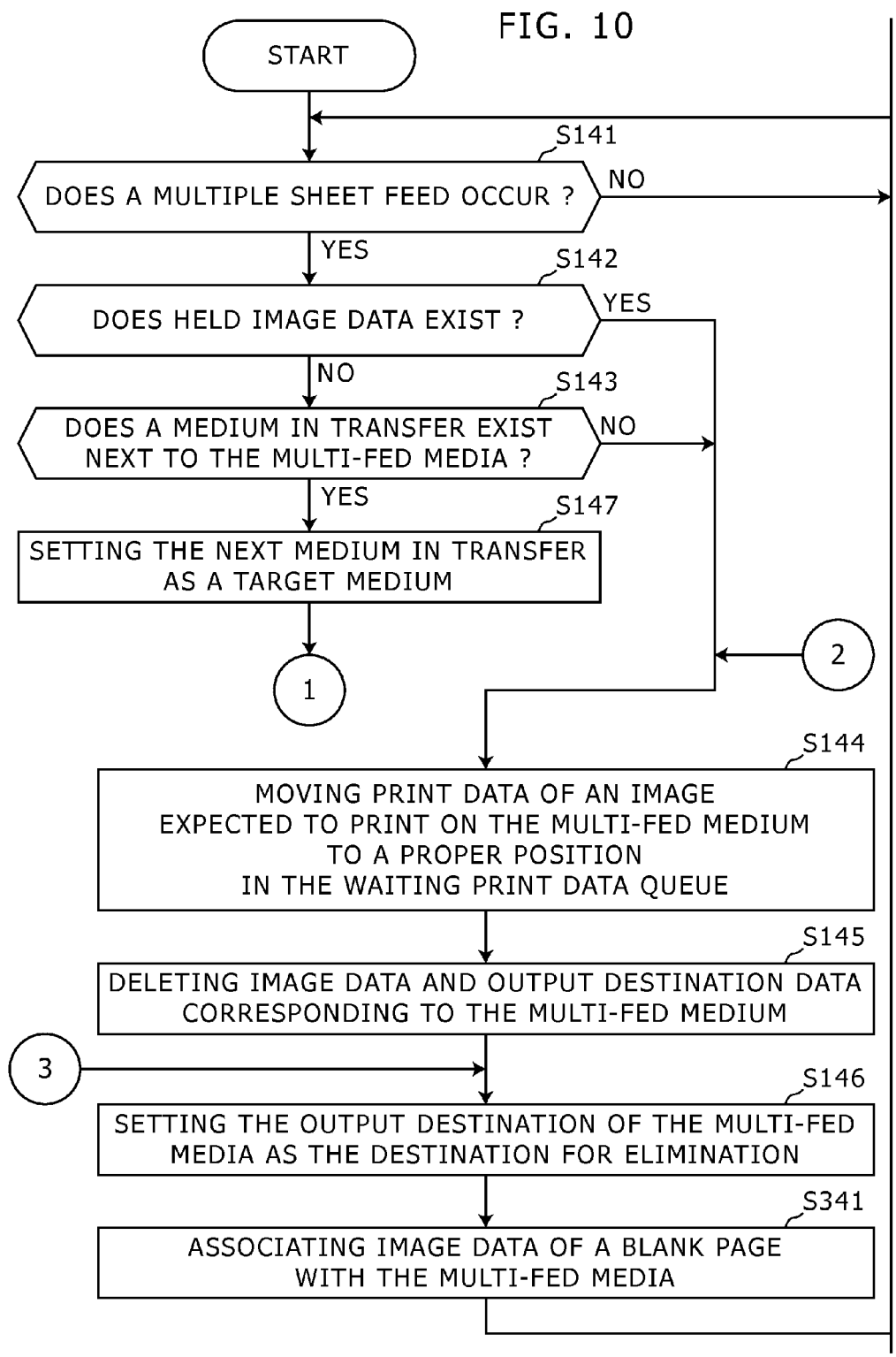

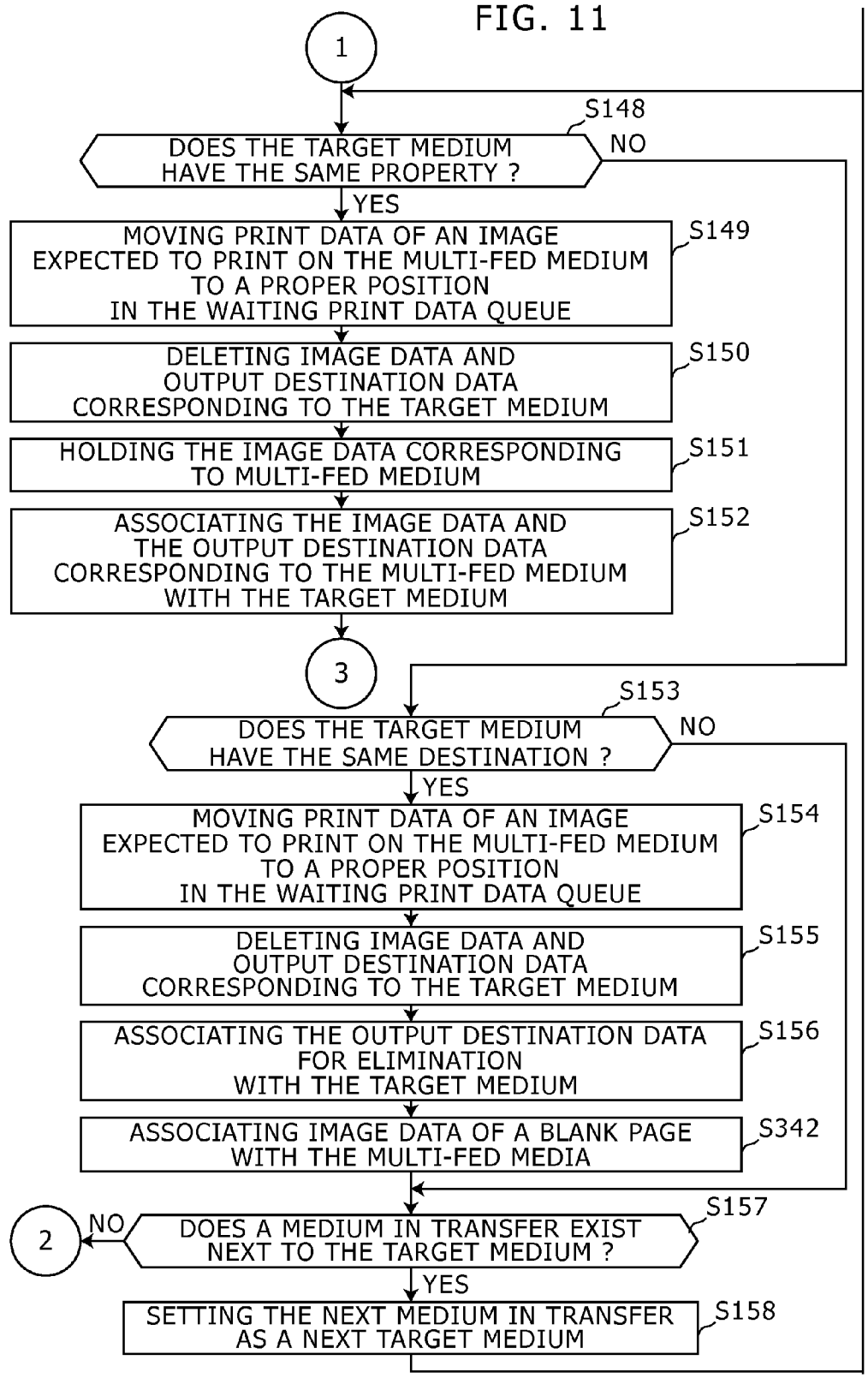

IMAGE FORMING APPARATUS AND PRINT CONTROL METHOD

CROSS-REFERENCE TO RELATED APPLICATIONS

This application relates to and claims priority rights from Japanese Patent Application: No. 2011-185200, filed on Aug. 26, 2011, the entire disclosures of which are hereby incorporated by reference herein.

BACKGROUND OF THE INVENTION

1. Field of the Invention

The present invention relates to image forming apparatuses and print control methods.

2. Description of the Related Art

If an image forming apparatus detects a multiple sheet feed of paper sheets as recording media, the apparatus cancels forming an image on the multi-fed sheets and outputs the multi-fed sheets to an output tray, and transfers a next sheet from a paper feed tray in order to form the image which was expected to form on the multi-fed sheets.

However, since this image forming apparatus starts to transfer the next sheet after finishing the output of the multi-fed sheets, it takes a lot of time to complete printing the image which was expected to print on the multi-fed sheets. Therefore, the number of sheets printed per unit time is small when a multiple sheet feed occurs.

SUMMARY OF THE INVENTION

An image forming apparatus according to an aspect of the present disclosure includes: a printing unit configured to perform printing on a recording medium; a multiple-sheet-feed detecting unit configured to detect a multiple sheet feed of the recording medium; an image holding unit configured to hold an image expected to print on the recording medium on which the multiple sheet feed is detected; and a print control unit configured to control the printing unit. The print control unit is further configured (a) to cancel printing on the recording medium on which the multiple sheet feed is detected, and (b) to cause the printing unit to print the image held by the image holding unit on another recording medium that (b1) is in transfer after the recording medium on which the multiple sheet feed is detected, (b2) is nearest in a transferring order to the recording medium on which the multiple sheet feed is detected, and (b3) has a property same as that of the recording medium on which the multiple sheet feed is detected.

Therefore, since an image expected to print on a recording medium on which a multiple sheet feed is detected is printed on another recording medium in transfer (i.e. another recording medium which has already been started to transfer), the time taken to complete printing the image is shorter than that taken to complete printing the image on a newly transferred recording medium. Consequently, it is capable of printing on many sheets per unit time when a multiple sheet feed is detected.

A print control method according to an aspect of the present disclosure includes the steps of: (a) detecting a multiple sheet feed of a recording medium; (b) holding an image expected to print on the recording medium on which the multiple sheet feed is detected; (c) canceling printing on the recording medium on which the multiple sheet feed is detected; and (d) printing the image held by the image holding unit on another recording medium that (d1) is in transfer after the recording medium on which the multiple sheet feed is detected, (d2) is nearest in a transferring order to the recording medium on which the multiple sheet feed is detected, and (d3) has a property same as that of the recording medium on which the multiple sheet feed is detected.

Therefore, since an image expected to print on a recording medium on which a multiple sheet feed is detected is printed on another recording medium in transfer, the time taken to complete printing the image is shorter than that taken to complete printing the image on a newly transferred recording medium. Consequently, it is capable of printing on many sheets per unit time when a multiple sheet feed is detected.

These and other objects, features and advantages of the present invention will become more apparent upon reading of the following detailed description along with the accompanied drawings.

BRIEF DESCRIPTION OF THE DRAWINGS

FIG. 9 shows a flowchart which explains a behavior of the MFP shown in FIG. 7 for each of recording media in transfer; and FIGS. 10 and 11 show a flowchart which explains a behavior of the MFP shown in FIG. 7 when detecting a multiple sheet feed.

DETAILED DESCRIPTION

Hereinafter, embodiments according to aspects of the present disclosure will be explained with reference to drawings.

Embodiment 1

Firstly, a configuration is explained of an MFP (Multifunction Peripheral) as an image forming apparatus in this embodiment.

Figure 1:
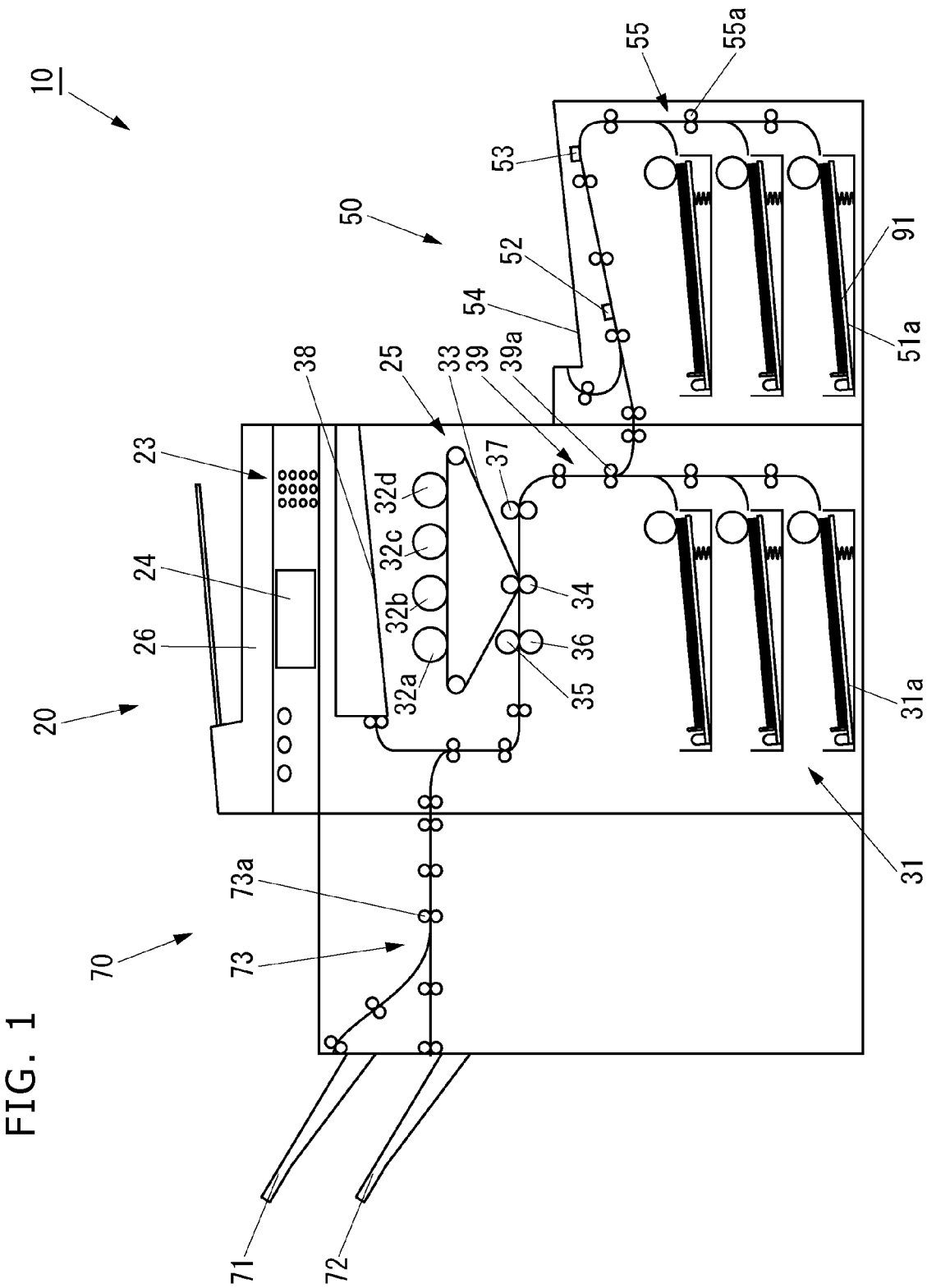
FIG. 1 shows a diagram which indicates a configuration of an MFP according to Embodiment 1 of the present disclosure.

FIG. 1 shows a diagram which indicates a configuration of an MFP according to Embodiment 1.

As shown in FIG. 1, the MFP 10 includes an MFP body 20, a side multi tray 50 connected to the MFP body 20, and a finisher 70 connected to the MFP body 20. The side multi tray 50 is a supplementary supplying device which supplies a recording medium 91 such as paper sheet to the MFP body 20. The finisher 70 performs post processing such as sorting and/or stapling the printed recording medium 91.

Figure 2:
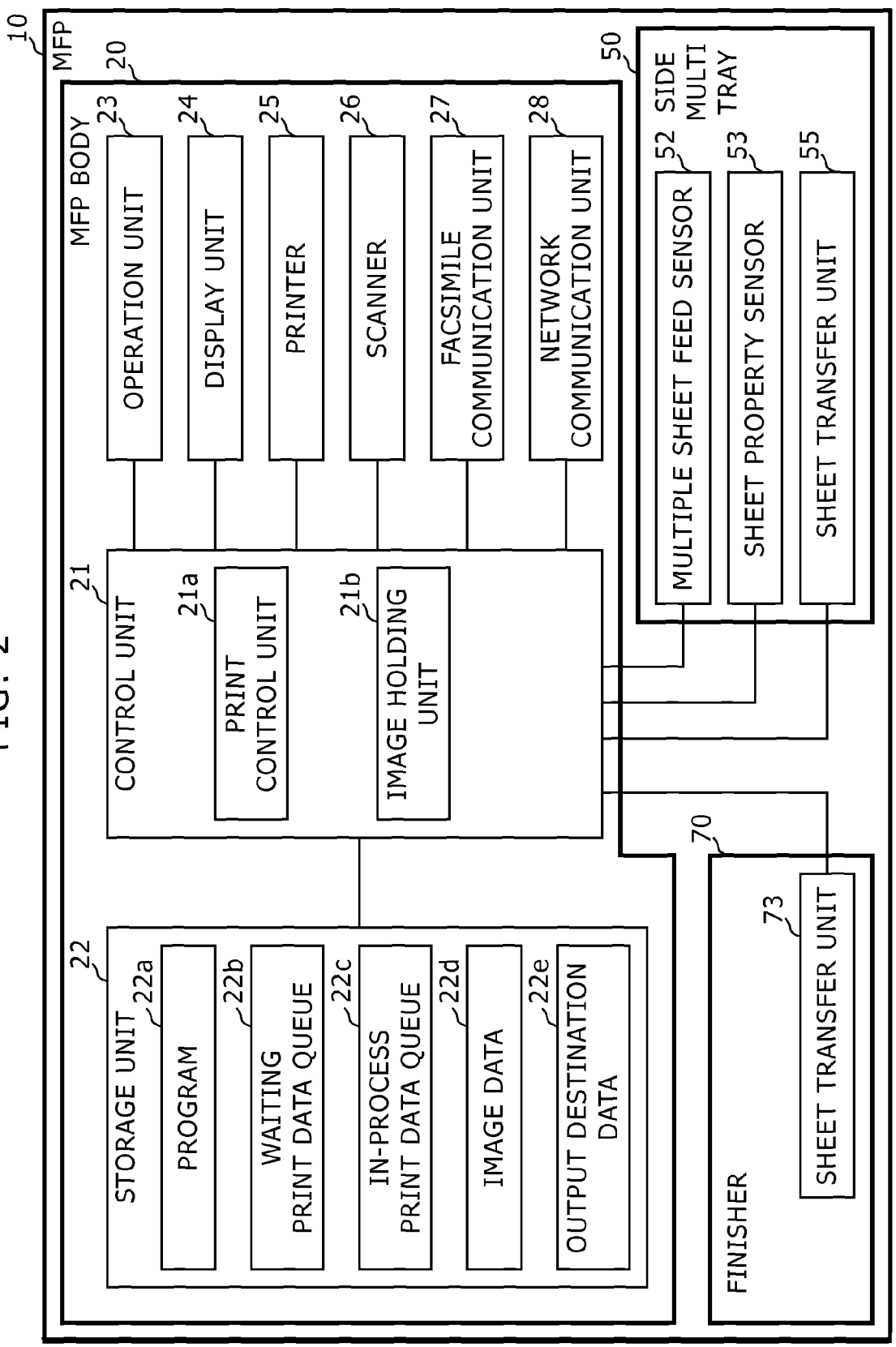
FIG. 2 shows a block diagram which indicates an electric configuration of the MFP shown in FIG. 1.

FIG. 2 shows a block diagram which indicates an electric configuration of the MFP 10.

As shown in FIG. 2, the MFP body 20 includes a control unit 21, a storage device 22, an operation unit 23, a display unit 24, a printer 25, a scanner 26, a facsimile communication unit 27, and a network communication unit 28.

The control unit 21 controls the whole MFP body 20. The storage device 22 is a memory device such as EEPROM (Electrically Erasable Programmable Read Only Memory) in which various data is stored. The operation unit 23 is an input device such as button for a user to input various operations. The display unit 24 is a display device such as LCD (Liquid Crystal Display) which displays various information. The printer 25 is a printing device which performs printing on a recording medium 91. The scanner 26 is an image reading device which scans an image of a document. The facsimile communication unit 27 is a facsimile device which performs facsimile communication with another external facsimile machine (not shown) via a communication line such as public telephone network. The network communication unit 28 is a network communication device which performs communication with another external device such as PC (Personal Computer) via a network such as LAN (Local Area Network).

The control unit 21 includes, for example, a CPU (Central Processing Unit), a ROM (Read Only Memory) in which a program and data have been stored, and a RAM (Random Access Memory) used for a work area of the CPU. The CPU executes a program stored in the ROM and the storage unit 22.

In the storage unit 22, a program 22a used for an image forming apparatus has been stored for the MFP body 20. In the storage unit 22, a waiting print data queue 22b, an in-process print data queue 22c, image data 22d, and output destination data 22e are stored. The waiting print data queue 22b is a data queue of print data for which a recording medium 91 has not been started to transfer. The print data is used for the printer 25 to perform printing. The in-process print data queue 22c is a data queue of print data for which a recording medium 91 is in transfer. The image data 22d is image data of an image to be printed on a recording medium 91 by the printer 25. The output destination data 22e is data which specifies an output destination to which a recording medium 91 is expected to output. A printing order of the print data is always managed. The image data 22d and the output destination data 22e are generated from print data in the waiting print data queue 22b, and are stored in association with a recording medium 91 in transfer.

The program 22a may have been stored in the MFP body in its manufacturing process or may be additionally installed in the MFP body 20 either from a medium such as CD (Compact Disk) or DVD (Digital Versatile Disk) or via a network.

The control unit 21 acts as a print control unit 21a and an image holding unit 21b by executing the program 22a stored in the storage unit 22. The print control unit 21a controls printing by the printer 25. The image holding unit 21b holds an image expected to print on a multi-fed medium, i.e. a recording medium 91 on which a multiple sheet feed is detected by a multiple sheet feed sensor 52 (mentioned below).

As shown in FIG. 1, the printer 25 includes a supplying device 31, photoconductor drums 32a to 32d, an intermediate transfer belt 33, an image transferring roller 34, a fixing roller 35, a pressurizing roller 36, a registration roller 37, an output tray 38, and a sheet transfer unit 39.

The supplying device 31 includes plural trays 31a which store recording media 91 and supplies the recording media 91. The photoconductor drums 32a to 32d are photoconductors on which toner images of cyan, magenta, yellow, and black are developed, which are expected to fix on a recording medium 91. The intermediate transfer belt 33 is an intermediate transfer member onto which the toner images are transferred from the photoconductor drums 32a to 32d. The image transferring roller 34 transfers the toner images transferred on the intermediate transfer belt 33 to a recording medium 91.

The fixing roller 35 fixes the transferred toner images on the recording medium 91 by heating. The pressurizing roller 36 presses the recording medium 91 against the fixing roller 35. The registration roller 37 is a roller to adjust the timing of transferring the recording medium 91 for the toner images transferred on the intermediate transfer belt 33. The output tray 38 is an output destination to which the printed recording medium 91 is outputted. The sheet transfer unit 39 includes plural sheet transferring rollers 39 and transfers a recording medium 91.

The side multi tray 50 includes trays 51a, a multiple sheet feed sensor 52, a sheet property sensor 53, a purge tray 54, and a sheet transfer unit 55. The plural trays 51a store recording media 91. The multiple sheet feed sensor 52 detects a multiple sheet feed of the recording medium 91. The sheet property sensor 53 detects a property such as thickness, material or color of recording medium 91. The purge tray 54 is a tray as an output destination for eliminating multi-fed media. The sheet transfer unit 55 includes plural sheet transferring rollers 55a, and transfers a recording medium 91.

A known multiple sheet feed sensor such as ultrasonic-wave type multiple sheet feed sensor or optical type multiple sheet feed sensor may be used as the multiple sheet feed sensor 52.

In the case that the sheet property sensor 53 detects a thickness of a recording medium 91, a known sheet thickness sensor such as contact type sheet thickness sensor or non-contact type sheet thickness sensor may be used as the sheet property sensor 53. Further, a method for the sheet property sensor 53 to detect a material of a recording medium 91 may be a known method such as a method for irradiating light to a surface of a recording medium 91, detecting its reflection light from the surface of the recording medium 91, and identifying a ruggedness of the surface of the recording medium 91 from the detection. Further, a method for the sheet property sensor 53 to detect a color of a recording medium 91 may be a known method such as a method for irradiating light to a surface of a recording medium 91, detecting its reflection light from the surface of the recording medium 91, and identifying a color of the recording medium 91 from the detection.

The plural trays 51a, the purge tray 54, and the sheet transfer unit 55 are a part of the printer 25.

The finisher 70 includes output trays 71 and 72, and a sheet transfer unit 73. The output trays 71 and 72 are output destinations to which a recording medium 91 printed by the MFP body 20 is outputted. The sheet transfer unit 73 includes plural sheet transferring rollers 73a and transfers a recording medium 91.

The output trays 71 and 72, and the sheet transfer unit 73 are a part of the printer 25.

In the following part, a behavior of the MFP 10 is explained.

In the MFP 10, the control unit 21 adds print data to the waiting print data queue 22b. For example, for copying, after the scanner 26 scans an image of a document, the control unit 21 generates print data based on the scanned image, and adds the generated print data to the waiting print data queue 22b. Further, after the facsimile communication unit 27 receives facsimile data from an external facsimile machine, the control unit 21 generates print data based on the received facsimile data, and adds the generated print data to the waiting print data queue 22b. Furthermore, after the network communication unit 28 receives print data from an external device, the control unit 21 adds the received print data to the waiting print data queue 22b.

Figure 3:
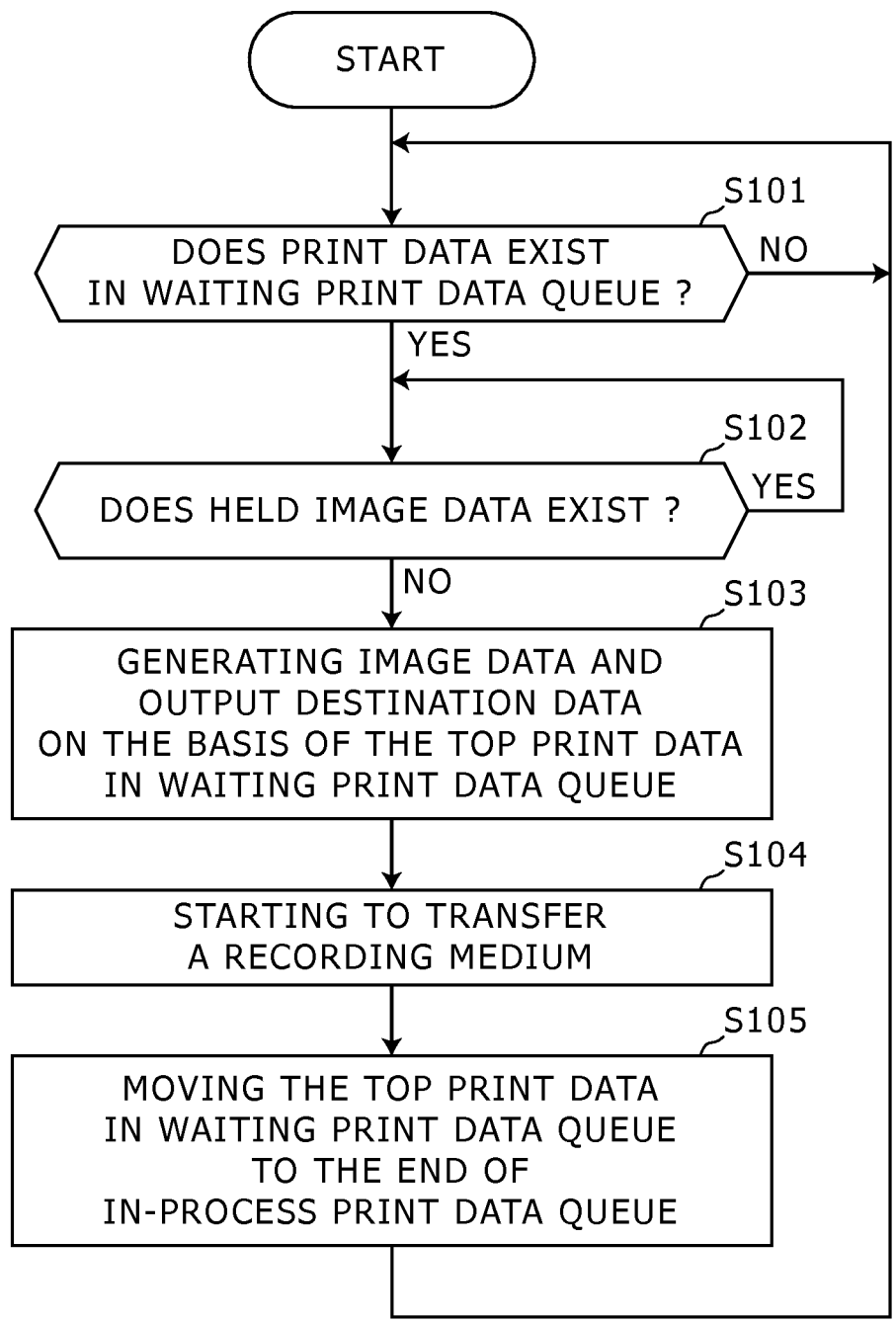
FIG. 3 shows a flowchart which explains a behavior of the MFP shown in FIG. 1 when performing printing on the basis of print data.

FIG. 3 shows a flowchart which explains a behavior of the MFP 10 when performing printing on the basis of print data.

As shown in FIG. 3, the print control unit 21a of the control unit 21 determines whether print data exists in the waiting print data queue 22b or not repeatedly until determining that print data exists in the waiting print data queue 22b (Step S101).

Upon determining that print data exists in the waiting print data queue 22b in Step S101, the print control unit 21a determines whether the held image data exists or not repeatedly until determining that the held image data does not exists (Step S102).

Upon determining that the held image data does not exist in Step S102, the print control unit 21a generates image data 22d and output destination data 22e based on the top print data in the waiting print data queue 22b (Step S103).

Subsequently, the print control unit 21a starts to transfer a recording medium 91 by the printer 25 in association with the top print data in the waiting print data queue 22b (Step S104). Here, the print control unit 21a causes the printer 25 to transfer a recording medium 91 from one of the plural trays 51a which is specified in the print data.

Subsequently, the print control unit 21a moves the top print data in the waiting print data queue 22b to the end of the in-process print data queue 22c (Step S105). Here, the print control unit 21a associates the recording medium 91 started to transfer in Step S104 with the print data moved to the in-process print data queue 22c in Step S105.

The print control unit 21a returns to Step S101 after processing Step S105.

It should be noted that the print control unit 21a performs a process shown in FIG. 3 while being capable of transferring a recording medium 91 following the multi-fed media when the multiple sheet feed sensor 52 detects a multiple sheet feed.

Figure 4:
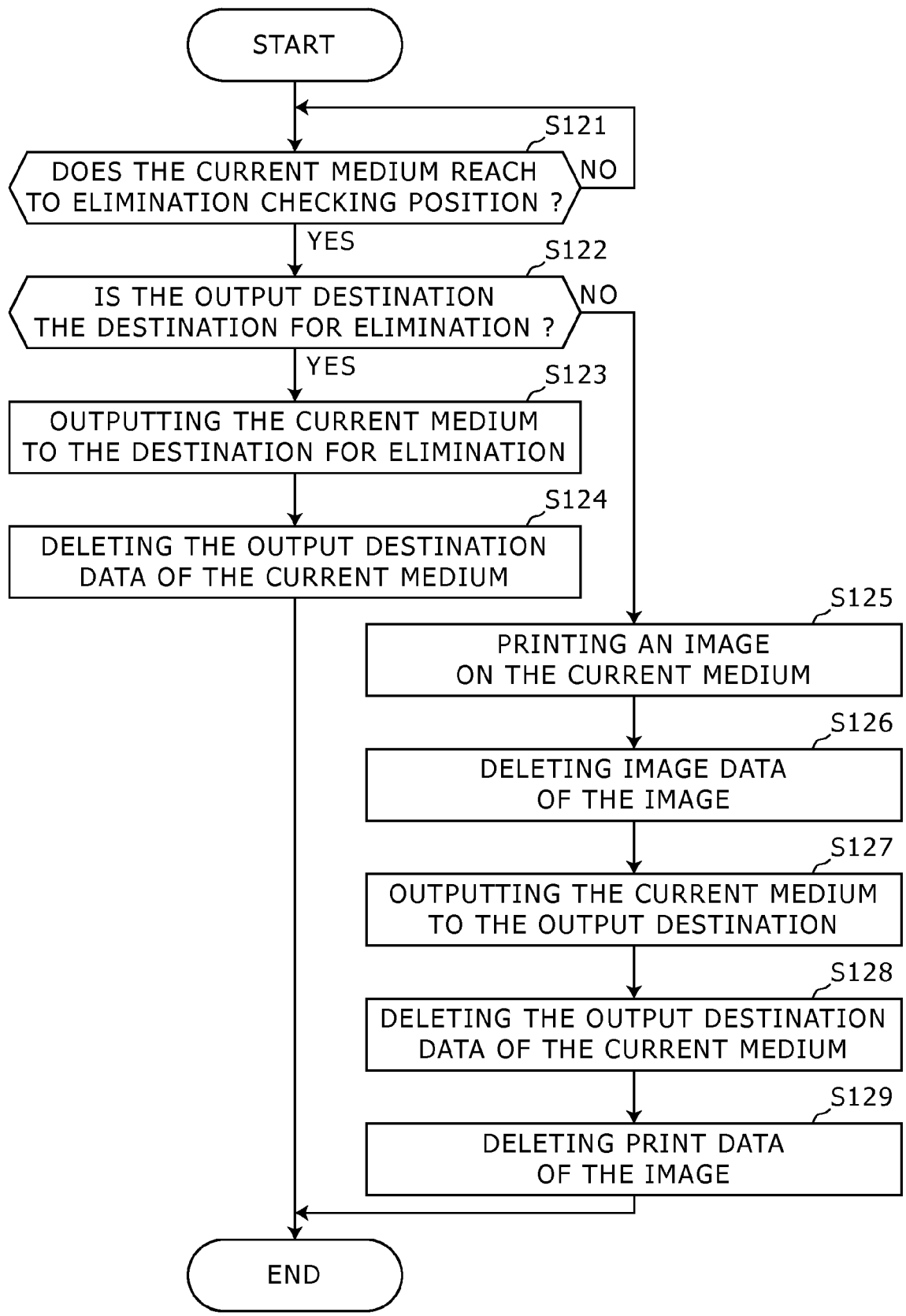
FIG. 4 shows a flowchart which explains a behavior of the MFP shown in FIG. 1 for each of recording media in transfer.

Upon processing Step S105, the control unit 21 performs a process shown in FIG. 4 for a recording medium 91 started to transfer in Step S104.

FIG. 4 shows a flowchart which explains a behavior of the MFP 10 for each of recording media 91 in transfer. The process shown in FIG. 4 is performed independently of the process shown in FIG. 3. Further, the process shown in FIG. 4 is performed independently for each of recording media 91 in transfer. Hereinafter, a recording medium 91 targeted in the process shown in FIG. 4 is referred as "current medium".

As shown in FIG. 4, the print control unit 21a of the control unit 21 determines whether the current medium reaches to an "elimination checking position" or not repeatedly on the basis of an output of a sensor until determining that the current medium reaches to the elimination checking position (Step S121). The "elimination checking position" is the position where it is determined whether the current medium is outputted to the purge tray 54 as an output destination for elimination. This sensor is disposed at the elimination checking position. In the transfer path of the current medium, the elimination checking position is a position in the downstream from the position of the multiple sheet feed sensor 52 and in the upstream from a diverging position to the output designation for elimination, i.e. the purge tray 54.

Upon determining that the current medium reaches to the elimination checking position in Step S121, the print control unit 21a determines whether the current medium is expected to output to the output destination for elimination, i.e. the purge tray 54 or not on the basis of the output destination data 22e stored in association with the current medium (Step S122).

If the print control unit 21a determines that the current medium is expected to output to the output destination for elimination in Step 122, the print control unit 21a outputs the current medium to the output destination for elimination, i.e. the purge tray 54 by controlling the sheet transfer unit 55 (Step S123). Therefore, in this case, the current medium is outputted without being printed.

Subsequently, the print control unit 21a deletes the output destination data 22e stored in association with the current medium (Step S124), and terminates the process shown in FIG. 4.

If in Step S122 it is determined that the current medium is not expected to output to the output destination for elimination, then the print control unit 21a causes to print an image on the current medium by controlling the photoconductor drums 32a to 32d, the intermediate transfer belt 33, the image transferring roller 34, the fixing roller 35, and the pressurizing roller 36 (Step S125). This printed image is an image expected to print on the current medium on the basis of the image data 22d stored in association with the current medium.

Subsequently, the print control unit 21a deletes the image data 22d stored in association with the current medium (Step S126). Here, if the deleted image data 22d is the held image data, then the held image data does not exist after the process of Step S126.

The print control unit 21a causes to output the current medium to the output destination to which the current medium is expected to output, i.e. the output tray 38, 71 or 72 by controlling the sheet transfer unit 39 and the sheet transfer unit 73 (Step S127). Therefore, in this case, the current medium is outputted with being printed.

Subsequently, the print control unit 21a deletes the output destination data 22e stored in association with the current medium (Step S128).

Subsequently, the print control unit 21a deletes print data stored in the in-process print data queue 22c in association with the current medium (Step S129), and terminates the process shown in FIG. 4.

Figure 5:
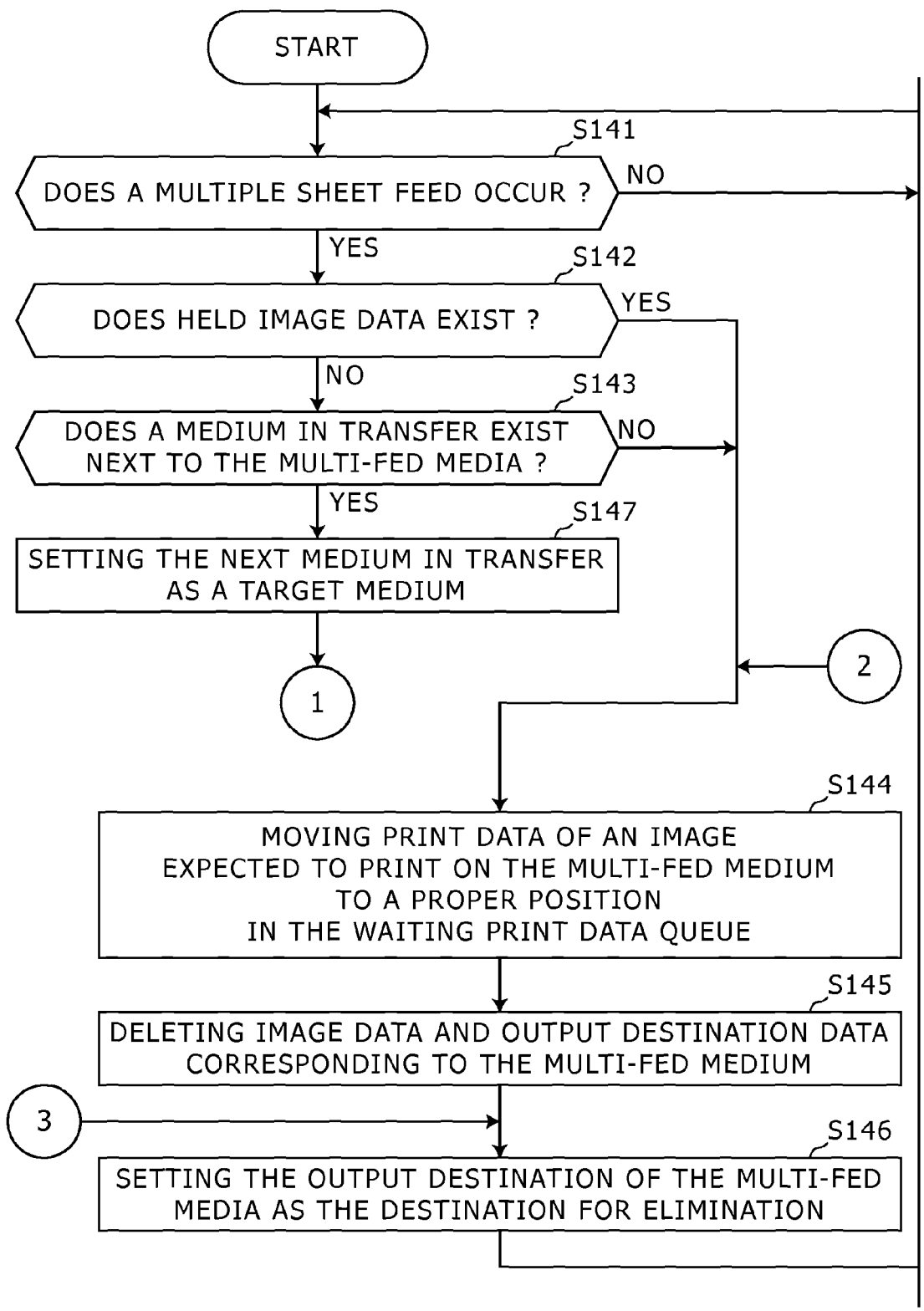
FIGS. 5 and 6 show a flowchart which explains a behavior of the MFP shown in FIG. 1 when detecting a multiple sheet feed.
Figure 6:
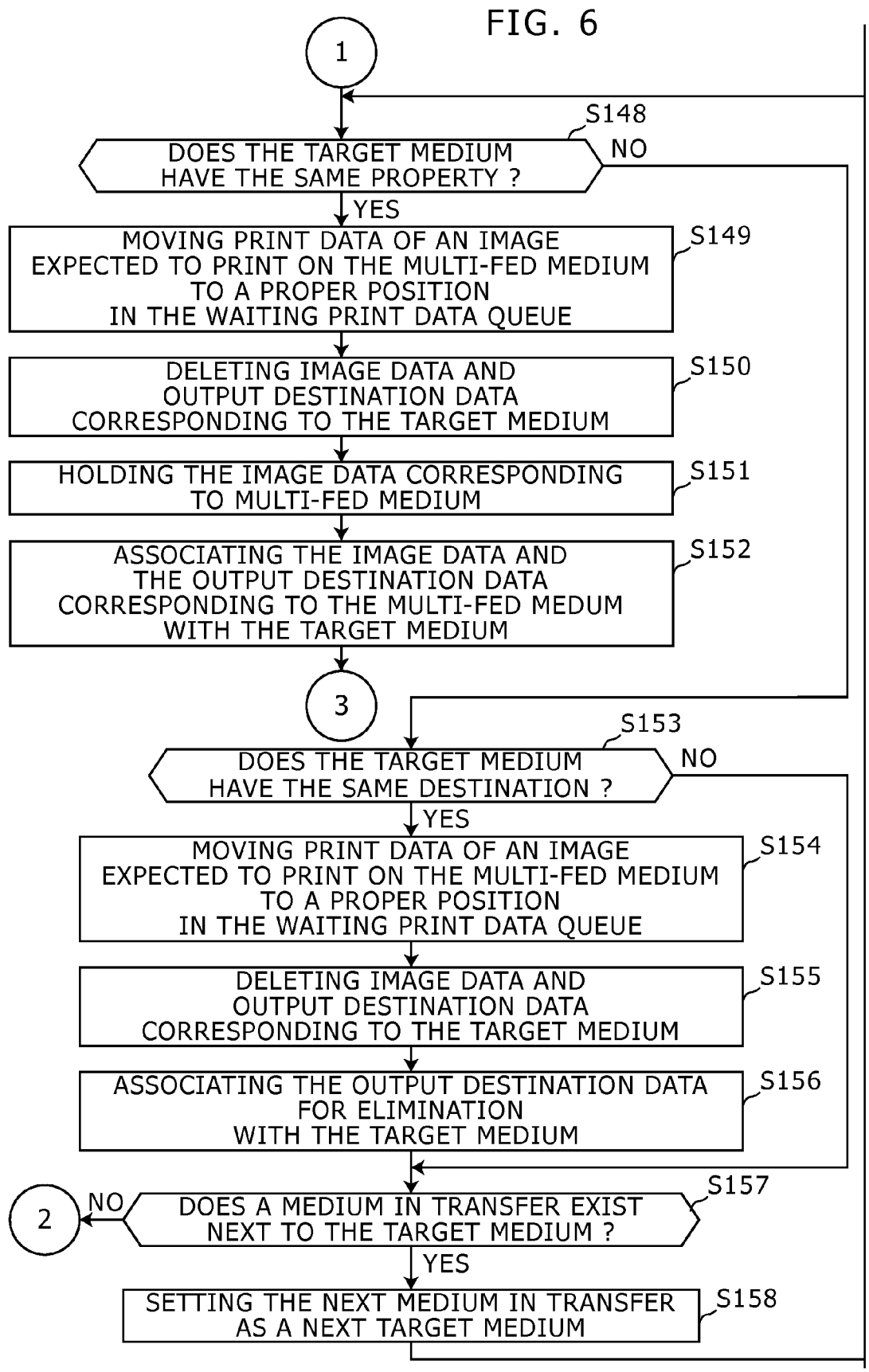

FIGS. 5 and 6 show a flowchart which explains a behavior of the MFP 10 when detecting a multiple sheet feed. The process shown in FIGS. 5 and 6 is performed independently of the processes shown in FIGS. 3 and 4.

As shown in FIGS. 5 and 6, the print control unit 21a of the control unit 21 determines whether a multiple sheet feed occurs or not repeatedly on the basis of the output of the multiple sheet feed sensor 52 until determining that a multiple sheet feed occurs (Step S141).

Upon determining that a multiple sheet feed occurs in Step S141, the print control unit 21a determines whether the held image data 22d exists or not (Step S142).

If the print control unit 21a determines that the held image data 22d does not exist in Step S142, then the print control unit 21a determines whether a recording medium 91 in transfer exists next to the multi-fed media determined in Step S141 or not on the basis of the in-process print data queue 22c (Step S143).

Here, if print data exists next to the print data in association with the multi-fed medium in the in-process print data queue 22c, then the print control unit 21a determines that a recording medium 91 in transfer exists next to the multi-fed media. Otherwise, if print data does not exist next to the print data in association with the multi-fed medium in the in-process print data queue 22c, then the print control unit 21a determines that a recording medium 91 in transfer does not exist next to the multi-fed media.

If the print control unit 21a determines either that the held image data 22d exists in Step S142 or that a recording medium 91 in transfer does not exist next to the multi-fed media, then the print control unit 21a moves the "multi-fed-medium print data" from the in-process print data queue 22c to a proper position in the waiting print data queue 22b (Step S144). Hereinafter, "multi-fed-medium print data" means print data of which an image is expected to print on a multi-fed medium, that is, print data in association with a multi-fed medium.

Specifically, if at least one piece of print data is stored in the waiting print data queue 22b prior to the "multi-fed-medium print data" in the printing order, then the "multi-fed-medium print data" is inserted next to the last one of the at least one piece of print data. Otherwise, if print data is not stored in the waiting print data queue 22b prior to the "multi-fed-medium print data" in the printing order, then the "multi-fed-medium print data" is inserted at the top of the waiting print data queue 22b.

Subsequently, the print control unit 21a deletes the image data 22d and the output destination data 22e in association with the multi-fed medium (Step S145).

Subsequently, the print control unit 21a generates the output destination data 22e which specifies the output destination for elimination, i.e. the purge tray 54, and associates the generated output destination data 22e with the multi-fed medium (Step S146), and returns to the process of Step S141.

If the print control unit 21a determines that a recording medium 91 in transfer exists next to the multi-fed media in Step S143, then the print control unit 21a sets the recording medium 91 in transfer next to the multi-fed media as a "target medium" (Step S147).

Subsequently, the print control unit 21a determines whether the target medium is a "same-property medium" or not (Step S148). Hereinafter, the "same-property medium" means a recording medium which has the same property as that of the multi-fed medium. The "property" means a characteristic such as size, feeding orientation, thickness, material, or color of a recording medium 91 in transfer. The print control unit 21a is capable of identifying the property of a recording medium 91 using various methods. For example, the print control unit 21a may identify the size and/or the feeding orientation of a recording medium 91 on the basis of setting specified by a user before transferring the recording medium 91, and may identify the size and/or the feeding orientation of a recording medium 91 on the basis of the output of an unshown sensor disposed in the tray 51a. Further, the print control unit 21a may identify the thickness, the material, and/or the color of a recording medium 91 on the basis of setting specified by a user before transferring the recording medium 91, and may identify the thickness, the material, and/or the color of a recording medium 91 on the basis of the output of the sheet property sensor 53.

If the print control unit 21a determines that the target medium is a same-property medium in Step S148, then the print control unit 21a moves print data of which an image is expected to print on the target medium (i.e. print data in association with the target medium) from the in-process print data queue 22c to a proper position in the waiting print data queue 22b (Step S149). Hereinafter, this print data is referred as "target print data".

Specifically, if at least one piece of print data is stored in the waiting print data queue 22b prior to the "target print data" in the printing order, then the "target print data" is inserted next to the last one of the at least one piece of print data. Otherwise, if print data is not stored in the waiting print data queue 22b prior to the "target print data" in the printing order, then the "target print data" is inserted at the top of the waiting print data queue 22b.

Subsequently, the print control unit 21a deletes the image data 22d and the output destination data 22e in association with the target medium (Step S150).

Subsequently, the image holding unit 21b of the control unit 21 holds the image data 22d stored in association with the multi-fed medium (Step S151). Hence, the image holding unit 21b holds an image expected to print on the multi-fed medium.

Subsequently, the print control unit 21a associates the image data 22d and the output destination data 22e stored in association with the multi-fed medium with the target medium (Step S152). Therefore, due to the change of the association, the image data 22d and the output destination data 22e in association with the multi-fed medium disappear.

Subsequently, the print control unit 21a performs the process of Step S146.

If the print control unit 21a determines that the target medium is not a same-property medium in Step S148, then the print control unit 21a determines whether the target medium is a "same-destination medium" or not (Step S153). Hereinafter, the "same-destination medium" means a recording medium which has the same output destination as that of the multi-fed medium.

If the print control unit 21a determines that the target medium is a "same-destination medium" in Step S153, then the print control unit 21a moves the print data of which an image is expected to print on the target medium (i.e. the "target print data") from the in-process print data queue 22c to a proper position in the waiting print data queue 22b (Step S154).

Subsequently, the print control unit 21a deletes the image data 22d and the output destination data 22e in association with the target medium (Step S155).

Subsequently, the print control unit 21a generates the output destination data 22e which specifies the output destination for elimination, i.e. the purge tray 54, and associates the generated output destination data 22e with the target medium (Step S156).

If the print control unit 21a either determines that the target medium is not a same-destination medium in Step S153 or performs the process of Step S156, then the print control unit 21a determines whether a recording medium 91 in transfer exists next to the target medium or not on the basis of the in-process print data queue 22c (Step S157). Here, if print data exists next to the print data in association with the target medium in the in-process print data queue 22c, then the print control unit 21a determines that a recording medium 91 in transfer exists next to the target medium. Otherwise, if print data does not exist next to the print data in association with the target medium in the in-process print data queue 22c, then the print control unit 21a determines that a recording medium 91 in transfer does not exist next to the target medium.

If the print control unit 21a determines that a recording medium 91 in transfer does not exist next to the target medium in Step S157, the print control unit 21a performs the process of Step S144.

Otherwise, if the print control unit 21a determines that a recording medium 91 in transfer exists next to the target medium in Step S157, the print control unit 21a sets a recording medium 91 in transfer next to the target medium as a next target medium (Step S158), and for the next target medium, performs the process of Step S148 again.

As mentioned above, if the multiple sheet feed sensor 52 detects a multiple sheet feed (YES at Step S141), then the image holding unit 21b holds an image expected to print on the multi-fed medium (Step S151). Further, if the multiple sheet feed sensor 52 detects a multiple sheet feed (YES at Step S141), then the print control unit 21a cancels printing on the multi-fed medium (Step S145 or S152), and causes to print the image held by the image holding unit 21b on a "same-property nearest medium" (Steps S125 and S152). Hereinafter, the "same-property nearest medium" means a recording medium which (b1) is in transfer after the multi-fed medium, (b2) is nearest in a transferring order to the multi-fed medium, and (b3) has a property same as that of the multi-fed medium.

Therefore, in the MFP 10, since an image expected to print on a multi-fed medium is printed on another recording medium in transfer, the time taken to complete printing the image is shorter than that taken to complete printing the image on a newly transferred recording medium. Consequently, it is capable of printing on many sheets per unit time when a multiple sheet feed is detected. Further, in the MFP 10, an image expected to print on a multi-fed medium is printed on the same-property nearest medium in transfer. Therefore, in the MFP 10, the number of recording media 91 outputted to the output destination for elimination is smaller than that in another configuration for (a) canceling printing on all of recording media 91 in transfer after the multi-fed medium when the multiple sheet feed is detected, (b) outputting the recording media 91 to the output destination for elimination, (c) starting to transfer other recording media 91 for images expected to print on the eliminated recording media, and (d) printing these images on the newly transferred recording media 91.

It should be noted that the print control unit 21a causes to transfer another recording medium 91 for an image originally expected to print on the same-property nearest medium, and to print this image on this recording medium (Steps S104 and S149). Further, if the same-property nearest medium does not exist when the multiple sheet feed sensor 52 detects a multiple sheet feed (NO at Step S143 or NO at Step S157), then the print control unit 21a causes to transfer another recording medium 91 for an image originally expected to print on the multi-fed medium, and to print this image on this recording medium (Steps S104 and S144). Furthermore, if the held image data 22d already exists when the multiple sheet feed sensor 52 detects a multiple sheet feed (YES at Step S142), then the print control unit 21a also causes to transfer another recording medium 91 for an image originally expected to print on the multi-fed medium, and to print this image on this recording medium (Steps S104 and S144).

Furthermore, when the multiple sheet feed sensor 52 detects a multiple sheet feed (YES at Step S141), the print control unit 21a causes to output the multi-fed medium to an output destination other than the output destination to which the multi-fed medium is expected to output (Steps S123 and S146), and outputs the same-property nearest medium to the output destination to which the multi-fed medium is expected to output (Steps S127 and S152). Therefore, in the MFP 10, the image expected to print on the multi-fed medium is printed on the same-property nearest medium, and the same-property nearest medium is outputted to the output destination to which the multi-fed medium is expected to output, namely, the output destination to which a user intends to output this image. In addition, the multi-fed media and the same-property nearest medium are prevented from being mixed in an output destination. For example, in the case that the printed media are stapled by the finisher 70, it is favorable that the multi-fed media (not printed) and the same-property nearest medium (printed the image expected to print on the multi-fed medium) are not mixed.

Furthermore, the print control unit 21a continues to cause to print on a "different-property-different-destination medium" (NO at Steps S125 and S148, and NO at Step S153). Hereinafter, the "different-property-different-destination medium" means a recording medium which is (a) in transfer after the multi-fed media, (b) not after the same-property nearest medium in the transferring order, and (c) expected to output to an output destination other than that of the multi-fed media. Therefore, in the MFP 10, the image expected to print on the multi-fed medium is printed on the same-property nearest medium, and since printing is continued on the "different-property-different-destination medium" which is not mixed with the same-property nearest medium, the number of sheets printed per unit time is larger than that by another configuration for canceling printing on the "different-property-different-destination medium".

Furthermore, the print control unit 21a cancels printing on a "different-property-same-destination medium" (NO at Step S148, YES at Step S153, and in Step S155), and causes to output the "different-property-same-destination medium" to an output destination other than the output destination to which the "different-property-same-destination medium" is expected to output (Step S123 and Step S156). Hereinafter, the "different-property-same-destination medium" means a recording medium which is (a) in transfer after the multi-fed media, (b) not after the same-property nearest medium in the transferring order, and (c) expected to output to the output destination to which the multi-fed medium is expected to output. Therefore, in the MFP 10, the image expected to print on the multi-fed medium is printed on the same-property nearest medium, and the different-property-same-destination medium (not printed) and the same-property nearest medium (printed) are prevented from being mixed in an output destination.

It should be noted that the print control unit 21a causes to transfer another recording medium 91 for an image originally expected to print on the different-property-same-destination medium, and to print this image on this recording medium (Steps S104 and S154).

In this embodiment, the print control unit 21a causes to cancel printing on the different-property-same-destination medium and to output it to the output destination for elimination. Alternatively, the print control unit 21a may cause to print the image expected to print on the different-property-same-destination medium, and to output it to an output destination other than the output destination to which the different-property-same-destination medium is expected to output. In this case, since the different-property-same-destination medium is outputted to an output destination other than the output destination to which the different-property-same-destination medium is expected to output, the different-property-same-destination medium is outputted to an output destination to which a user does not intend to output.

Embodiment 2

Firstly, a configuration is explained of an MFP as an image forming apparatus in this embodiment.

In the following part, a part of the configuration of the MFP in this embodiment is explained. The other part is the same as that of the MFP in Embodiment 1 (see FIGS. 1 and 2), and therefore, the same notations as those in Embodiment are attached to components in the other part, and the explanation thereof is omitted.

Figure 7:
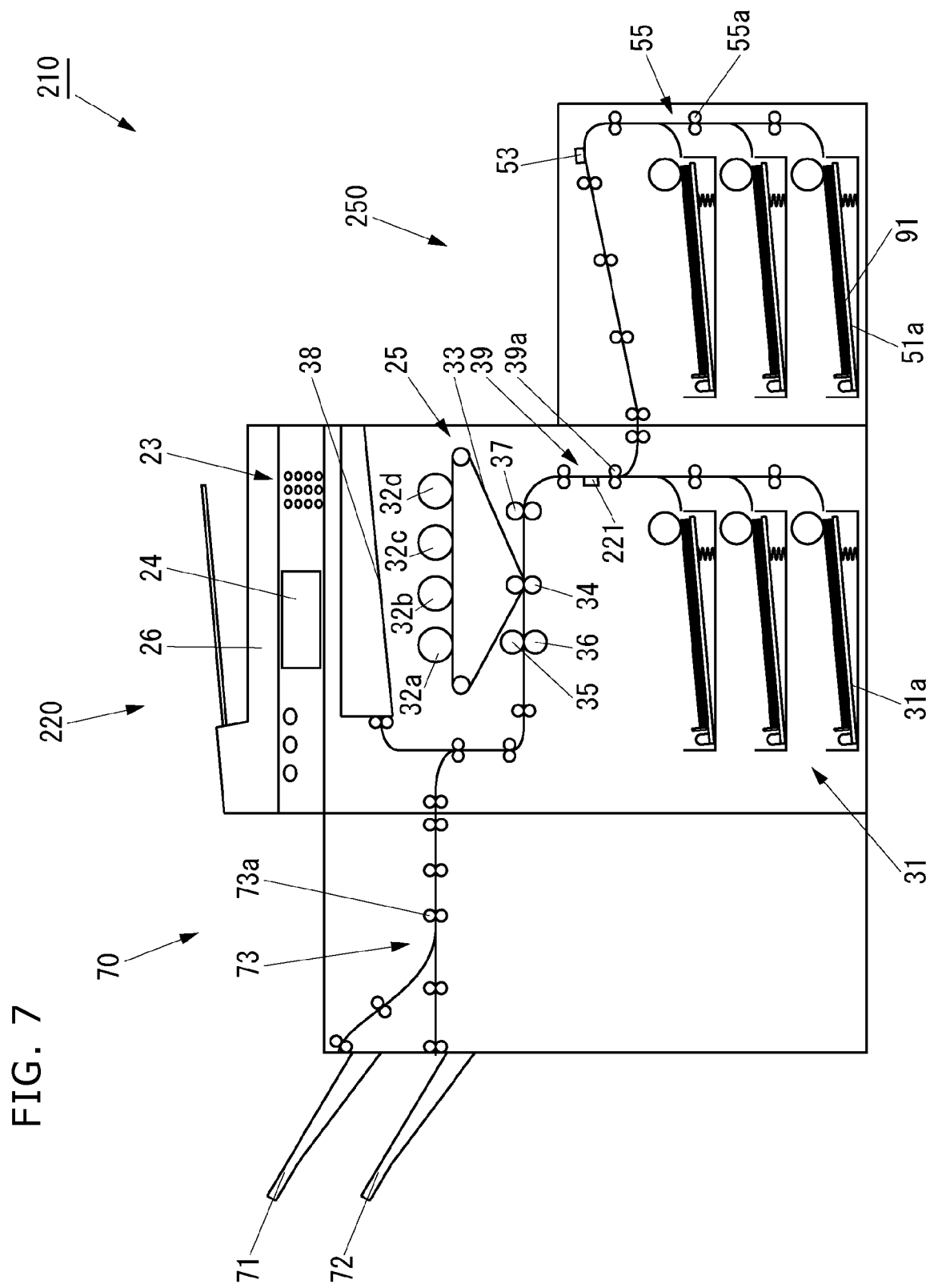
FIG. 7 shows a diagram which indicates a configuration of an MFP according to Embodiment 2 of the present disclosure.
Figure 8:
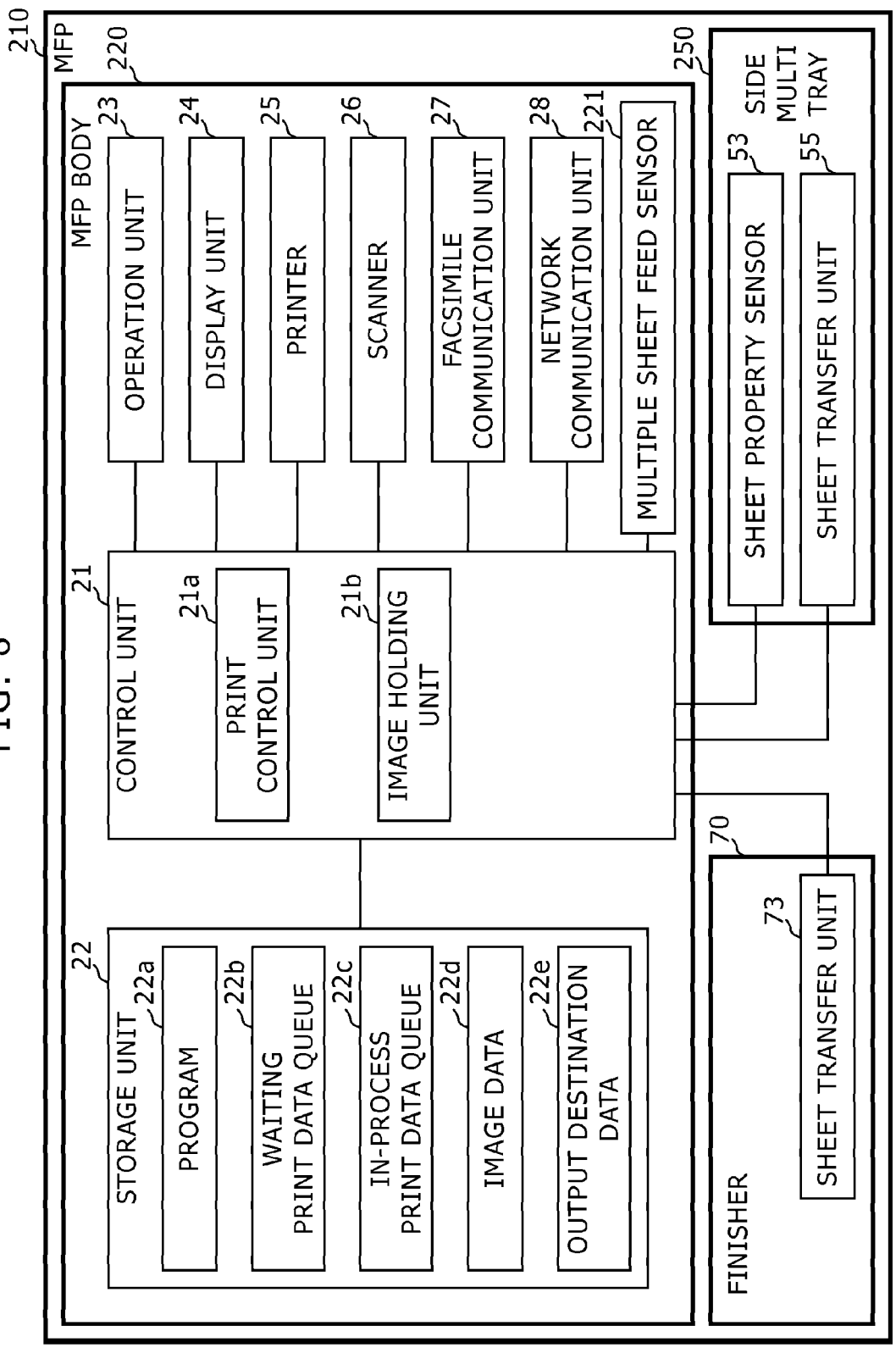
FIG. 8 shows a block diagram which indicates an electric configuration of the MFP shown in FIG. 7.

FIG. 7 shows a diagram which indicates a configuration of an MFP according to Embodiment 2 of the present disclosure. FIG. 8 shows a block diagram which indicates an electric configuration of the MFP 210.

As shown in FIGS. 7 and 8, the configuration of the MFP 210 includes an MFP body 220 and a side multi tray 250 instead of the MFP body 20 and the side multi tray 50 of the MFP 10 (see FIGS. 1 and 2), and other components same as those in the MFP 10.

The configuration of the MFP body 220 includes a multiple sheet feed sensor 221 and other components same as those in the MFP 10. The multiple sheet feed sensor 221 is the same as the multiple sheet feed sensor 52 in FIGS. 1 and 2.

The side multi tray 250 has a configuration obtained by removing the multiple sheet feed sensor 52 and the purge tray 54 from the configuration of the side multi tray 50 in FIG. 1.

In the MFP 210, the output destination for elimination is the output tray 38.

In the following part, a behavior of the MFP 210 is explained.

In the following part, a part of the behavior of the MFP 210 is explained. The other part is the same as that of the MFP 10 in Embodiment 1 (see FIGS. 3 to 6), and therefore, the same notations as those in Embodiment 1 are attached to steps in the other part, and the explanation thereof is omitted.

FIG. 9 shows a flowchart which explains a behavior of the MFP 210 for each of recording media 91 in transfer. In this embodiment, the process shown in FIG. 9 is performed instead of the process shown in FIG. 4.

In Embodiment 2, in the transfer path of the current medium, the elimination checking position of Step S121 in FIG. 9 is a position in the downstream from the position of the multiple sheet feed sensor 221 and in the upstream from a position where the current medium places at the timing when the development of toner images is started on the photoconductor drums 32a to 32d.

In the process shown in FIG. 9, if in Step S122 the print control unit 21a determines that the current medium is expected to output to the output destination for elimination, then the print control unit 21a performs processes of Steps S321 and S322 before the process of Step S123.

In the process of Step S321, the print control unit 21a causes to transfer the current medium using the image transferring roller 34, the fixing roller 35, and the pressurizing roller 36 without developing toner images on the photoconductor drums 32a to 32d on the basis of the image data 22d in association with the current medium. Image data 22d processed in Step S321 is image data of a blank page.

The process of Step S322 is the same as the process of the Step S126.

FIGS. 10 and 11 show a flowchart which explains a behavior of the MFP 210 when detecting a multiple sheet feed. In this embodiment, the process shown in FIGS. 10 and 11 is performed instead of the process shown in FIGS. 5 and 6.

In the process shown in FIGS. 10 and 11, the print control unit 21a performs the process of Step S341 between the processes of Step S146 and Step S141, and the process of Step S342 between the processes of Step S156 and Step S157.

In the process of Step S341, the print control unit 21a generates image data of a blank page as the image data 22d, and associates the generated image data with the multi-fed medium.

In the process of Step S342, the print control unit 21a generates image data of a blank page as the image data 22d, and associates the generated image data with the target medium.

As mentioned above, the print control unit 21a in the MFP 210 causes to output a recording medium 91 on which printing was canceled through the fixing roller 35 (Steps S123, S145, S321 and S341, Steps S123, S152, S321 and S341 or Steps S123, S155, S321 and S342).

The recording medium 91 on which printing was canceled may shrink due to the heat of the fixing roller 35, and therefore, it may not be suitable to be reused after it is outputted to the output destination for elimination. In the MFP 210, when a multiple sheet feed is detected, printing is performed on the same-property nearest medium among one or more recording media 91 in transfer after the multi-fed medium. Consequently, the number of the recording media 91 which are not suitable to be reused tends to be smaller than that in another configuration for (a) canceling printing on a multi-fed medium and all recording media 91 in transfer after the multi-fed medium when a multiple sheet feed is detected, and (b) outputting them to the output destination for elimination. This is an advantage due to printing on the same-property nearest medium among recording media 91 in transfer after the multi-fed media.

The description of the present invention has been presented for purposes of illustration and description, and is not intended to be exhaustive or limited to the invention in the form disclosed.

In the aforementioned embodiments, the MFPs include the side multi tray and the finisher. Alternatively, if the MFP bodies include a multiple sheet feed sensor and plural output destinations, the MFPs may not include the side multi tray and the finisher.

Further, as well as the aforementioned embodiments of MFPs, other embodiments are available such as printer (i.e. device for printing purpose only), facsimile machine (i.e. device for facsimile communication purpose only), or copier (i.e. device for copying purpose only).

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
a printing unit configured to perform printing on a recording medium;
a multiple-sheet-feed detecting unit configured to detect a multiple sheet feed of the recording medium;
an image holding unit configured to hold an image expected to print on the recording medium on which the multiple sheet feed is detected; and
a print control unit configured to control the printing unit; and
wherein the print control unit is further configured (a) to cancel printing on the recording medium on which the multiple sheet feed is detected, (b) to cause the printing unit to print the image held by the image holding unit on another recording medium that (b1) is in transfer after the recording medium on which the multiple sheet feed is detected, (b2) is nearest in a transferring order to the recording medium on which the multiple sheet feed is detected, and (b3) has a property same as that of the recording medium on which the multiple sheet feed is detected, (c) to cause to output a recording medium on which the multiple-sheet-feed detecting unit does not detect a multiple sheet feed to a first output destination, and output a recording medium on which the multiple-sheet-feed detecting unit detects a multiple sheet feed to a second output destination different from the first output destination, and (d) to cause to output the recording medium on which the image held by the image holding unit is printed to the first output destination.

2. The image forming apparatus according to claim 1, wherein:

the print control unit is further configured to cause to continue to print, when the multiple-sheet-feed detecting unit detects a multiple sheet feed, on a recording medium that is (e1) in transfer at a timing when the multiple sheet feed is detected, (e2) after the recording medium on which the multiple sheet feed is detected, (e3) before the recording medium on which the image held by the image holding unit is to be printed, and (e4) expected to output to an output destination other than the second output destination.

3. The image forming apparatus according to claim 1, wherein:

the print control unit is further configured (f) to cancel printing on a recording medium that is (f1) after the recording medium on which the multiple sheet feed is detected, (f2) before the recording medium on which the image held by the image holding unit is to be printed, and (f3) expected to output to the second output destination, and (g) to output the recording medium on which printing is canceled to an output destination other than the second output destination.

4. The image forming apparatus according to claim 2, wherein:

the print control unit is further configured (f) to cancel printing on a recording medium that is (f1) after the recording medium on which the multiple sheet feed is detected, (f2) before the recording medium on which the image held by the image holding unit is to be printed, and (f3) expected to output to the second output destination, and (g) to output the recording medium on which printing is canceled to an output destination other than the second output destination.

5. The image forming apparatus according to claim 1, further comprising:

a fixing unit configured to fix a toner image on the recording medium by heating; and wherein the print control unit is further configured to output the recording medium on which printing is canceled through the fixing unit.

6. A print control method, comprising the steps of:
(a) detecting a multiple sheet feed of a recording medium;
(b) holding an image expected to print on the recording medium on which the multiple sheet feed is detected;
(c) canceling printing on the recording medium on which the multiple sheet feed is detected;
(d) printing the held image on another recording medium that (d1) is in transfer after the recording medium on which the multiple sheet feed is detected, (d2) is nearest in a transferring order to the recording medium on which the multiple sheet feed is detected, and (d3) has a property same as that of the recording medium on which the multiple sheet feed is detected;
(e1) outputting a recording medium on which the multiple sheet feed is detected to a first output destination;
(e2) outputting a recording medium on which a multiple-sheet-feed is not detected to a second output destination, said second output destination being different from said first output destination; and
(e3) outputting the recording medium on which the held image is printed to the second output destination.

* * * * *